United States Patent
Chen et al.

(10) Patent No.: US 9,346,218 B2
(45) Date of Patent: May 24, 2016

(54) THREE DIMENSIONAL PRINTING APPARATUS

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Peng-Yang Chen, New Taipei (TW); Wen-Ten Lin, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 48 days.

(21) Appl. No.: 14/284,394

(22) Filed: May 22, 2014

(65) Prior Publication Data

US 2015/0298396 A1    Oct. 22, 2015

(30) Foreign Application Priority Data

Apr. 16, 2014   (TW) .............................. 103113906 A

(51) Int. Cl.
  *B29C 67/00*    (2006.01)
  *B33Y 30/00*    (2015.01)
  *B29L 31/00*    (2006.01)

(52) U.S. Cl.
  CPC ......... *B29C 67/0085* (2013.01); *B29C 67/0062* (2013.01); *B29L 2031/00* (2013.01); *B33Y 30/00* (2014.12)

(58) Field of Classification Search
  CPC  B29C 67/0051; B29C 67/0085; B33Y 10/00; B33Y 30/00; B29L 2031/00

USPC .......................................................... 264/497
  See application file for complete search history.

(56) References Cited

U.S. PATENT DOCUMENTS 5,174,931 A * 12/1992 Almquist ................ B29C 41/12
                                                     118/100
2010/0247703 A1* 9/2010 Shi ........................ B29C 67/0081
                                                     425/375

FOREIGN PATENT DOCUMENTS

| CN | 101850615 | 10/2010 |
| CN | 203418764 | 2/2014 |
| CN | 203449608 | 2/2014 |

OTHER PUBLICATIONS

"Office Action of Taiwan Counterpart Application," issued on Dec. 1, 2015, p. 1-p. 7.

* cited by examiner

Primary Examiner — Alison L Hindenlang
Assistant Examiner — Mohamed K Ahmed Ali
(74) Attorney, Agent, or Firm — Jianq Chyun IP Office

(57) ABSTRACT

A three dimensional printing apparatus including a base, a tank, a modeling platform, and a plurality of floating units is provided. A liquid forming material is filled in the tank. Each of the floating units connects between the base and the tank, such that the tank is disposed on the base in floating manner. The modeling platform is movably immersed in the liquid forming material. A three dimensional object is formed and adhered between the modeling platform and a bottom of the tank. The modeling platform drives and tilts the tank to move out of the base by the three dimensional object, such that the three dimensional object is released from the bottom of the tank by gravity.

8 Claims, 3 Drawing Sheets

THREE DIMENSIONAL PRINTING APPARATUS

CROSS-REFERENCE TO RELATED APPLICATION

This application claims the priority benefit of Taiwan application serial no. 103113906, filed on Apr. 16, 2014. The entirety of the above-mentioned patent application is hereby incorporated by reference herein and made a part of this specification.

BACKGROUND

1. Technical Field

The technical field relates to a printing apparatus, and particularly relates to a three-dimensional printing apparatus.

2. Description of Related Art

In recent years, various methods using the additive manufacturing technology, such as building a model layer by layer, to construct three-dimensional (3D) models have been proposed with the continuous development of science and technology. Generally speaking, the additive manufacturing technology converts design data of three-dimensional models constructed with computer-aided design (CAD) software, for example, into a plurality of thin (pseudo-two-dimensional) cross-sectional layers that are continuously stacked. Meanwhile, a variety of technical means capable of forming a plurality of thin cross-sectional layers are proposed one after another. For example, a printing module of the printing apparatus may move along an XY plane above the base according to spatial coordinates XYZ constructed from the design data of a three-dimensional model, such that the construction material may form a correct shape of a cross-sectional layer. The construction material may be cured naturally or cured through a heating process or radiation of a light source, so as to form the desired cross-sectional layer. Therefore, as the printing module moves along Z-axis in layers, a plurality of cross-sectional layers are stacked along the Z-axis, such that the construction material is formed into a three-dimensional object through solidification in layers.

Taking the technology using a light source to solidify the construction material and form the three-dimensional object as an example, the printing module is immersed into a liquid forming material filled in the tank. Then, a light source module irradiates the liquid forming material on the XY plane, such that the liquid forming material is cured and stacked on a movable platform of the printing module. Thus, as the movable platform of the printing module moves along Z-axis, the liquid forming material may be cured in layers to be stacked and form a three-dimensional object. However, how to effectively peel the three-dimensional object form the movable platform without damaging the appearance thereof after the three-dimensional object is formed is still an issue for people skilled in the art.

SUMMARY

The disclosure provides a three-dimensional printing apparatus using a floating structure between a tank and a base to smoothly release a three-dimensional object from the tank.

The three-dimensional printing apparatus includes a base, a tank, a modeling platform, and a plurality of floating units. The tank is filled with a liquid forming material. The floating units are respectively connected between the base and the tank, such that the tank is disposed on the base in a floating manner. The modeling platform is movably immersed in the liquid forming material. The three-dimensional object is formed and adhered between the modeling platform and a bottom of the tank. The modeling platform drives and tilts the tank to move away from the base by the three-dimensional object, such that the three-dimensional object is released from the bottom of the tank by gravity.

According to an embodiment of the disclosure, a viscosity between the three-dimensional object and the bottom of the tank is smaller than a viscosity between the three-dimensional object and the modeling platform.

According to an embodiment of the disclosure, the three-dimensional object is close to one of the floating units while away from remaining of the floating units.

According to an embodiment of the disclosure, the base has a support part and a plurality of first connection parts. The first connection parts extend from the support part and located at opposite sides of the support part. The tank has a tank body and a plurality of second connection parts. The second parts extend from the tank body and located at opposite sides of the tank body. The three-dimensional printing apparatus further includes a plurality of springs. Each of the springs is connected between the first connection part and the second connection part to form the floating unit, such that the tank body is supported on the support part in the floating manner.

According to an embodiment of the disclosure, when the tank body moves away from the support part, the first connection part is located on a moving path of the second connection part.

According to an embodiment of the disclosure, the floating units at opposite sides of the base or the tank have different movable displacements.

According to an embodiment of the disclosure, the springs at the opposite sides of the base or the tank have different elastic coefficients.

According to an embodiment of the disclosure, the base or the tank has a first side and a second side that are opposite. In each of the floating units at the first side, there is a first relative distance between the first connection part and the second connection part corresponding to each other. In each of the floating units at the second side, there is a second relative distance between the first connection part and the second connection part corresponding to each other. The first relative distance differs from the second relative distance.

According to an embodiment of the disclosure, the three-dimensional object is located at a center position of the bottom of the tank.

According to an embodiment of the disclosure, the three-dimensional printing apparatus is a stereolithography (SLA) printing apparatus.

Based on the embodiments above, the tank of the three-dimensional printing apparatus is disposed on the base in a floating manner by using the floating units. Therefore, when the modeling platform gradually moves away from the bottom of the tank to form a three-dimensional object therebetween, the modeling platform may pull the tank through the three-dimensional object by using a floating structure formed by the base and the tank, as the three-dimensional object is still adhered between the modeling platform and the tank, so as to tilt the tank and release the three-dimensional object from the bottom of the tank by gravity.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated

DESCRIPTION OF THE EMBODIMENTS

Figure 1:
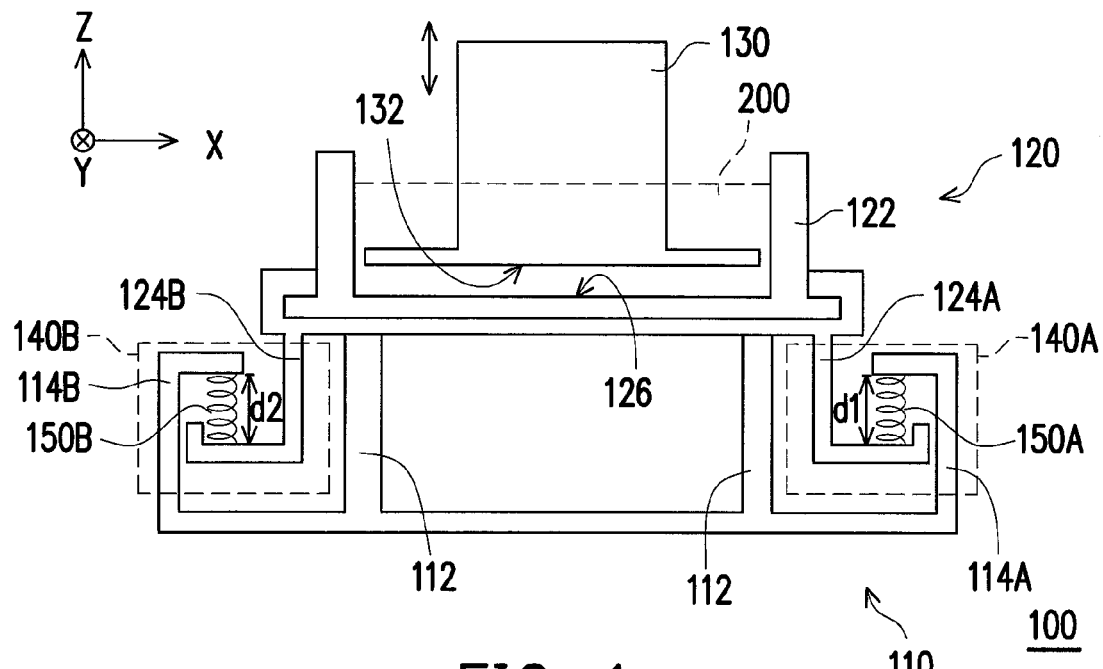
FIG. 1 is a side view illustrating a three-dimensional printing apparatus according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
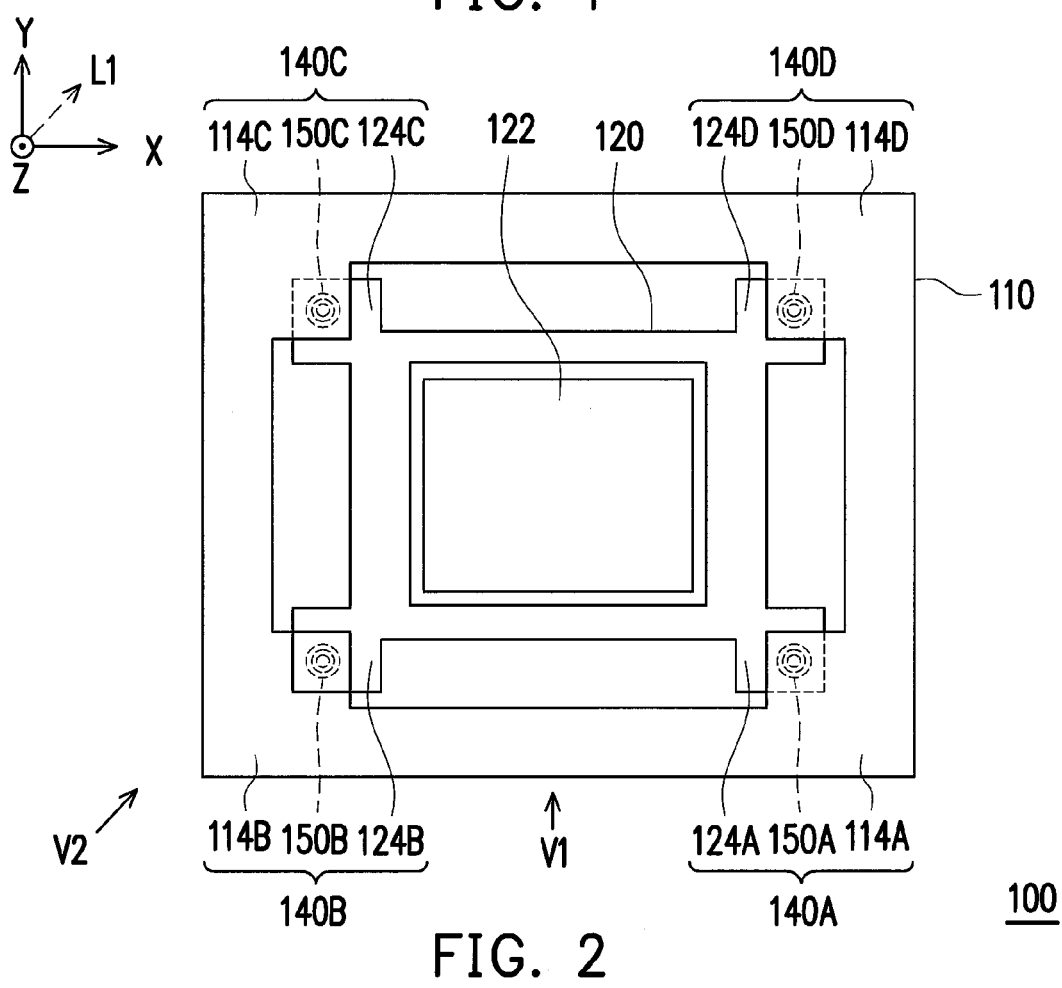
FIG. 2 is a top view of the three-dimensional printing apparatus of FIG. 1.
Figure 3:
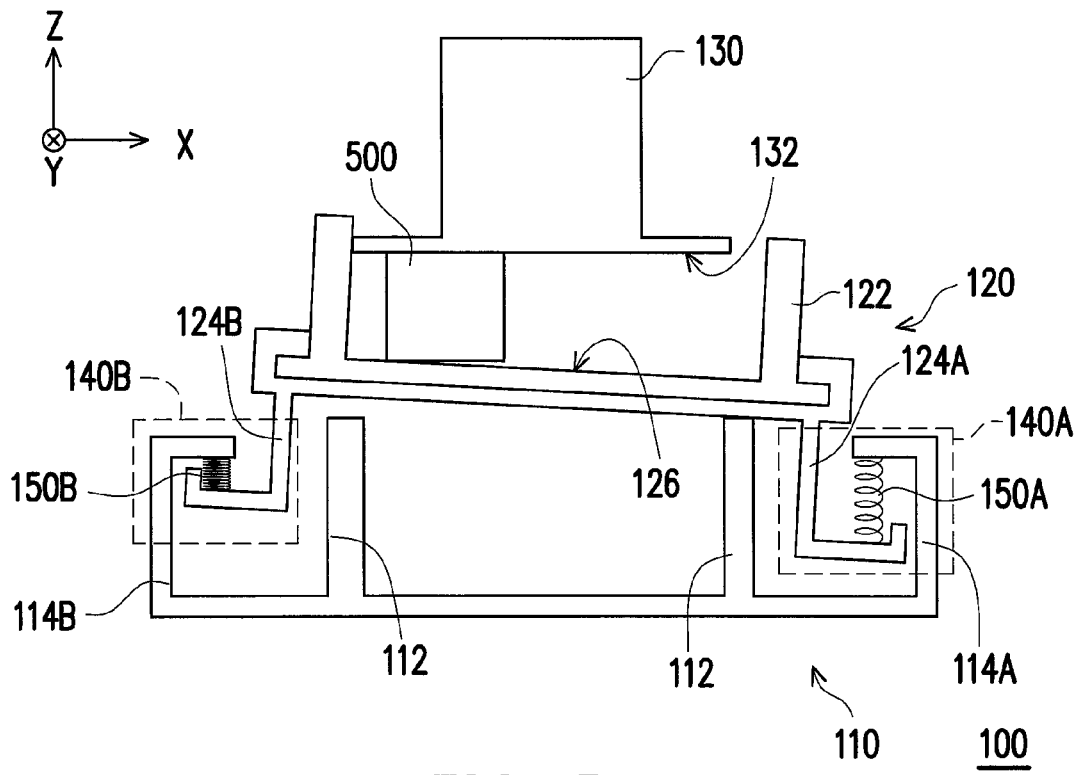
FIG. 3 is a schematic view illustrating the three-dimensional printing apparatus of FIG. 1 forming a three-dimensional object.

FIG. 1 is a side view illustrating a three-dimensional printing apparatus according to an embodiment of the disclosure. FIG. 2 is a top view of the three-dimensional printing apparatus of FIG. 1. FIG. 3 is a schematic view illustrating the three-dimensional printing apparatus of FIG. 1 forming a three-dimensional object. Referring to FIGS. 1-3 simultaneously, in this embodiment, a three-dimensional printing apparatus 100 is a stereolithography (SLA) printing apparatus, for example, including a base 110, a tank 120, a modeling platform 130, and a plurality of floating units 140A to 140D. Here, only necessary components related to the disclosure are shown. Remaining of the structure may be referred to the conventional technology related to SLA. In addition, a Cartesian coordinate system is provided herein as reference for describing relevant operations.

In this embodiment, the tank 120 is filled with a liquid forming material 200. The modeling platform 130 is controlled by a control module (not shown) to be movably immersed in the liquid forming material 200. Furthermore, light from a curing light source (not shown) is irradiated to the modeling platform 130 to cure the liquid forming material 200 between a modeling surface 132 of the modeling platform 130 and a bottom of the tank 120. In addition, the modeling platform 130 is driven to gradually move away from the bottom 126 of the tank 120 along Z-axis, so as to form a three-dimensional component 500 through solidification in layers.

Referring to FIGS. 1 and 3 again, the floating units 140A and 140B are respectively disposed at opposite sides of the tank 120 or the base 110, such that the tank 120 may be disposed on the base 110 in a floating manner. Accordingly, when the three-dimensional object 500 is formed, as the three-dimensional object 500 is still adhered between the modeling surface 132 of the modeling platform 130 and the bottom 126 of the tank 120, the operation of the modeling platform 130 moving away from the tank 120 also drives the tank 120 to move in the same direction, such as a positive Z-axis direction shown in FIG. 1 or 3, through the three-dimensional object 500. In this embodiment, since the base 110 and the tank 120 are in a floating state, and the three-dimensional object 500 is close to the floating unit 140B at the left side (compared with the floating unit 140A at the right side that is relatively distant), the tank 120 may thus be in a tilted state while the tank 120 is pulled, as shown in FIG. 3. Accordingly, in this embodiment, under a circumstance that a viscosity of the three-dimensional object 500 with respect to the bottom 126 of the tank 120 is smaller than a viscosity between the modeling surface 132 of the modeling platform 130 and the three-dimensional object 500, the three-dimensional object 500 may be gradually released from the bottom 126 of the tank 120 by gravity.

The same circumstance also occurs when the three-dimensional object 500 is close to the floating unit 140A at the right side (compared with the floating unit 140B at the left side that is relatively distant). Namely, once a position at which the three-dimensional object 500 is formed is not at a center position of the bottom 126 of the tank 120, the tank 120 may be tilted when the modeling platform 130 is pulled due to a structural characteristic resulted from the floating units 140A and 140B, such that the three-dimensional object 500 may be gradually released from the bottom 126 of the tank 120 by gravity.

Referring to FIGS. 1 and 2, specifically speaking, the base 110 of this embodiment has a support part 112 and first connection parts 114A to 114D. The first connection parts 114A to 114D respectively extend from the support part 112 in a radial direction and are located at opposite sides of the support part 112. In addition, the tank 120 has a tank body 122 and second connection parts 124A and 124D. In addition, the second connection parts 124A and 124D respectively extend from the tank body 122 in a radial direction and are located at opposite sides of the tank body 122. The radial direction here refers to a radiating direction with the support part 112 or the tank body 122 being the center. In other words, as shown in FIG. 2, the first connection parts 114A to 114D are disposed to surround the support part 112, while the second connection parts 124A and 124D are disposed to surround the tank body 122.

In addition, the three-dimensional printing apparatus 100 further includes a plurality of springs 150A to 150D. Each of the springs 150A to 150D is connected between the first connection parts 114A to 114D and the second connection parts 124A to 124D to form the floating units 140A to 140D. Namely, the floating units 140A to 140D are disposed to surround the base 110 or the tank 120. Therefore, viewing from a viewing angle V1 (shown in FIG. 2), the three-dimensional printing apparatus 100 is in configurations shown in FIG. 1 or 3. In other words, the floating units 140A and 140B are located at opposite sides of the base 110 or the tank 120.

In this way, the tank body 122 may be supported on the support part 112 in floating manner. In the configuration shown in FIG. 1, the tank body 122 is substantially supported on the plurality of support parts 112, while in the configuration shown in FIG. 3, the tank body 122 is pulled by the modeling platform 130 and the three-dimensional object 500 along the positive Z-axis direction to be moved away from the support part 112. After the three-dimensional object 500 is released from the bottom 126 of the tank 120, the tank 120 may be restored to an original position through the springs 150A to 150D and gravity. In addition, the support part 112 may further function as a support and position-limiting structure to restore the tank body 122 to the original position, such that the tank body 122 is restored back to a horizontal surface.

However, the disclosure is not limited to a tilted state resulted from the floating units 140A to 140D. Referring to FIG. 2 again, when the three-dimensional printing apparatus 100 is observed from a viewing angle V2, the base 110 or the tank 120 may be distinguished into opposite parts along axis L1. Namely, at this time, the floating units 140A and 140C are considered to be disposed at two opposite sides of the base 110 or the tank 120. Also, the three-dimensional object 500 may be formed at a position close to the floating unit 140C or a position close to the floating unit 140A to achieve a similar tilting effect.

In other words, the embodiment is capable of forming the three-dimensional object 500 at a position close to one of the floating units while away from remaining of the floating units in a two-dimensional space, such as an X-Y plane shown in FIG. 2, such that the tank 120 is in different tilted states capable of releasing the three-dimensional object 500 from the bottom of the tank 120 by gravity. Meanwhile, the disclosure is not limited to the number of floating units. In other words, any configurations that may dispose the floating units at opposite sides of the base 110 or the tank 120 in an appropriate way may achieve the effect of tilting the tank 120.

Also, the disclosure is not limited by how the tank 120 is tilted. Here, a viewing angle shown in FIG. 1 is described for an illustrative purpose, while the floating units at other opposite sides are similar and equally applicable. Referring to FIG. 1 again, there is a first relative distance d1 defined between the first connection part 114A and the second connection part 124A corresponding to each other in the floating unit 140A at one side of the base 110 or the tank 120, while there is a second relative distance d2 defined between the first connection part 114B and the second connection part 124B corresponding to each other in the floating unit 140B at the other side. As shown in FIG. 1, the first relative distance d1 and the second relative distance d2 are equal. In addition, the springs of this embodiment have the same characteristics (e.g. initial lengths, elastic coefficients, etc.). In other words, in the embodiment shown in FIGS. 1-3, movable displacements of the floating units 140A to 140D are the same. Therefore, when the three-dimensional object 500 is formed at a position not at the center position of the bottom 126 of the tank 120, a moment of force to the tank 120 may be produced through the modeling platform 130 pulling the three-dimensional object 500, thereby tilting the tank 120.

Figure 4:
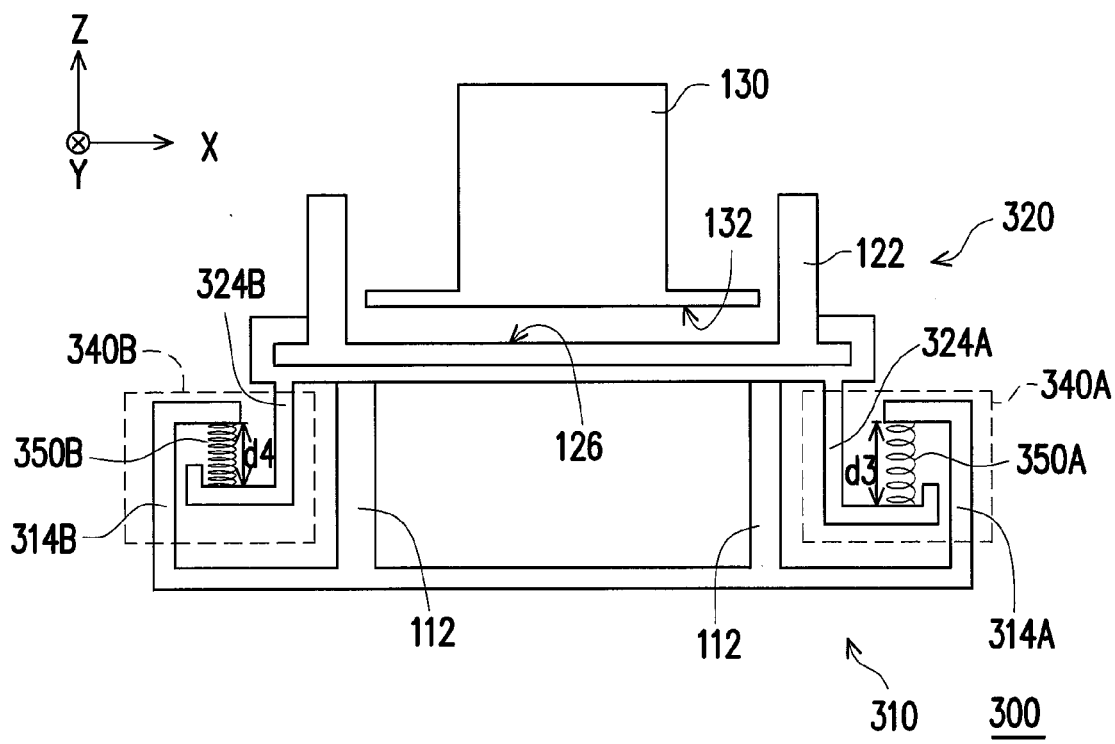
FIG. 4 is a side view illustrating a three-dimensional printing apparatus according to another embodiment of the disclosure.

Based on the above, it can be known that the movable displacement of the floating unit is determined by the relative distance between the connection parts and the spring characteristic. Accordingly, the designer may appropriately adjust the relevant characteristic of the floating units to tilt the tank to release the three-dimensional object. FIG. 4 is a side view illustrating a three-dimensional printing apparatus according to another embodiment of the disclosure. Referring to FIG. 4, what differs from the embodiment above is that in a three-dimensional printing apparatus 300, floating units 340A and 340B at opposite sides of a base 310 or a tank 320 have different movable displacements. More specifically, relative distances d3 and d4 between first connection parts 314A and 314B and second connection parts 324A and 324B are different. In this embodiment, the relative distance d3 is longer than the relative distance d4, thus making degrees of deformation of springs 350A and 350B different. Such configuration also allows the tank body 122 to be tilted when the modeling platform pulls the tank 320. Similarly, in an embodiment not shown herein, the designer may design relative distances between the first connection parts and the second connection parts in the floating units to be equal, while using springs of different elastic coefficients for connection, and the effect of the floating units having different movable displacements may still be achieved.

Figure 5:
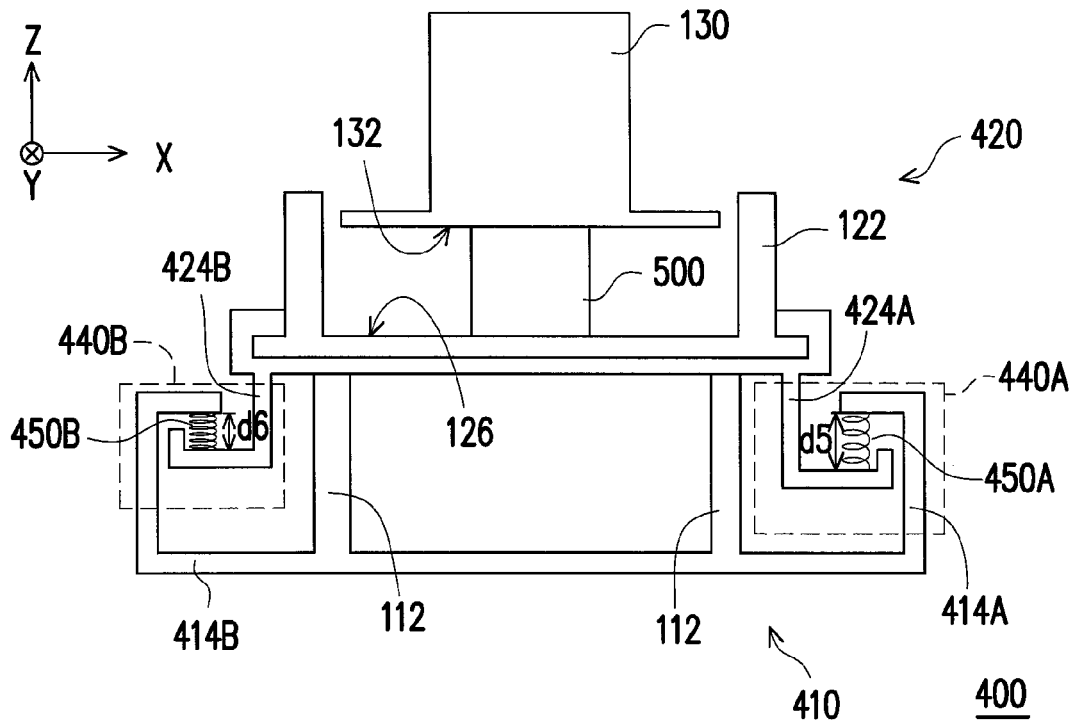
FIG. 5 is a side view illustrating a three-dimensional printing apparatus according to another embodiment of the disclosure.
Figure 6:
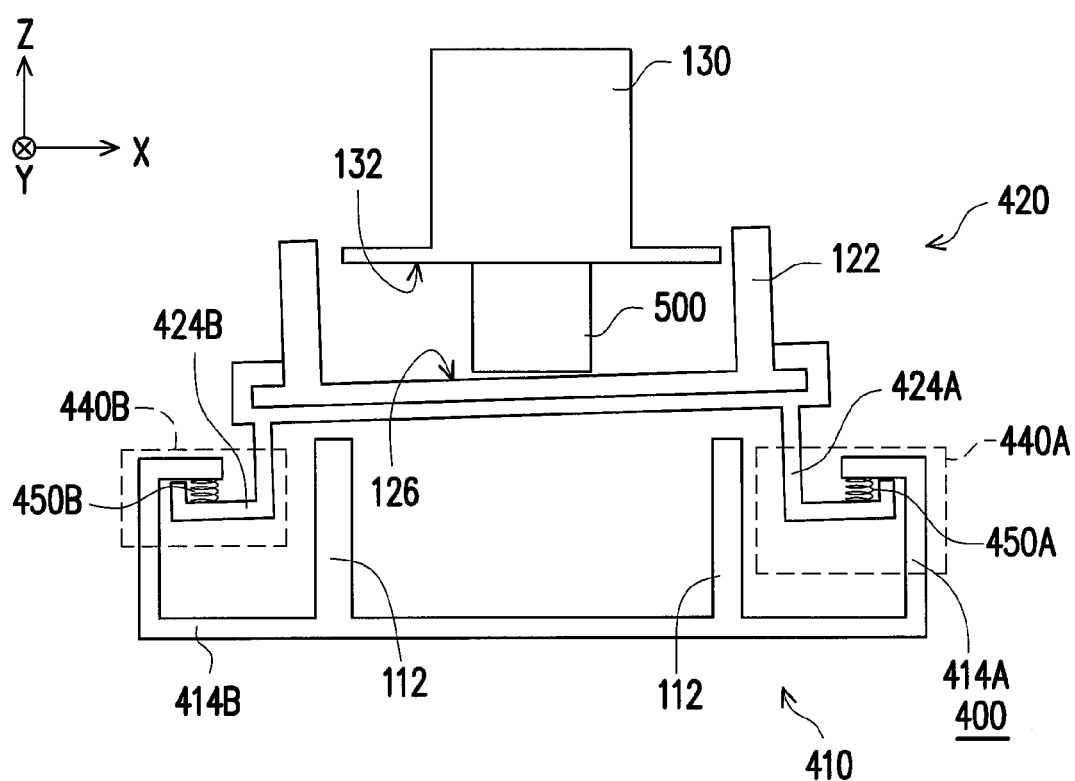
FIG. 6 is a schematic view illustrating the three-dimensional printing apparatus of FIG. 5 after a three-dimensional object is formed.

FIG. 5 is a side view illustrating a three-dimensional printing apparatus according to another embodiment of the disclosure. FIG. 6 is a schematic view illustrating the three-dimensional printing apparatus of FIG. 5 after a three-dimensional object is formed. Referring to FIGS. 5 and 6, in a three-dimensional printing apparatus 400, the three-dimensional object 500 is formed at the center position of the bottom 126 of a tank 420. Namely, when the modeling platform 130 pulls the tank 420, moments of force to floating units 440A and 440B at opposite sides of a base 410 or the tank 420 are considered to be the same. Based on the above, in the floating units 440A and 440B at the opposite sides of the base 410 or the tank 420, relative distances d5 and d6 between first connection parts 414A and 414B and second connection parts 424A and 424B are different, and degrees of deformation of springs 450A and 450B are modified accordingly, so as to make movable displacements of the floating units 440A and 440B different. Therefore, the tank 420 may still be tilted, as shown in FIG. 6. In addition, based on the previous embodiment, the relative distances of the connection parts may be designed to be the same as well, while the different displacements of the floating units may be achieved merely by manipulating elastic coefficients of the springs in this embodiment.

In view of the forgoing, in the embodiments of the disclosure, the floating units are disposed between the base and the tank, such that the position of the tank may be maintained and supported by using the support part of the base. In addition, the floating units may further provide a mechanism for the tank to float with respect to the base. Thus, when the modeling platform moves away from the tank, the modeling platform may pull the tank through the three-dimensional object as the three-dimensional object is still adhered between the modeling platform and the tank.

In addition, when the three-dimensional object is located at a position not at the center position of the bottom of the tank, namely when the three-dimensional object is close to one of the floating units while away from remaining of the floating units, the modeling platform may produce different moments of force to the floating units, such that the tank is pulled by the modeling platform in the tilted state. Thus, due to the viscosity between the three-dimensional object and the modeling platform being greater than the viscosity between the three-dimensional object and the tank and the effect of gravity, the three-dimensional object may be smoothly released from the bottom of the tank. Furthermore, when the three-dimensional object is located at the center position of the bottom of the tank, the movable displacements of the floating units at the opposite sides of the base or the tank may be further manipulated to similarly tilt the tank to release the three-dimensional object. In addition, the movable displacements of the floating units are determined by the relative distances between the connection parts, the characteristic of the springs, or a combination thereof. The designer may appropriately adjust relevant characteristics and determine the position of the three-dimensional object in the tank accordingly.

It will be apparent to those skilled in the art that various modifications and variations can be made to the structure of the disclosure without departing from the scope or spirit of the disclosure. In view of the foregoing, it is intended that the disclosure covers modifications and variations of this disclosure provided they fall within the scope of the following claims and their equivalents.

What is claimed is:

1. A three-dimensional printing apparatus, comprising:
a base;
a tank, filled with a liquid forming material;

a plurality of floating units, respectively connected between the base and the tank, such that the tank is disposed on the base in a floating manner; and a modeling platform be movably immersed in the liquid forming material, wherein a three-dimensional object is formed and adhered between the modeling platform and a bottom of the tank, and the modeling platform configured to pull the tank away from the base by pulling the three dimensional object, such that the three-dimensional object is released from the bottom of the tank by gravity, wherein the base has a support part and at least one first connection part and at least one second connection part extending from the support part and located at opposite sides of the support part, the tank has a tank body and at least one third connection part and at least one fourth connection part extending from the tank body and located at opposite sides of the tank body, and the three-dimensional printing apparatus further comprises a plurality of springs, wherein the springs are respectively connected between the first connection part and the third connection part and between the second connection part and the fourth connection part to form the floating units, such that the tank body is supported on the support part in the floating manner.

2. The three-dimensional printing apparatus as claimed in claim 1, wherein the three-dimensional object is close to one of the floating units while away from remaining of the floating units.

3. The three-dimensional printing apparatus as claimed in claim 1, wherein when the tank body moves away from the support part, the first connection part is located on a moving path of the second connection part.

4. The three-dimensional printing apparatus as claimed in claim 1, wherein the floating units at opposite sides of the base or the tank have different movable displacements.

5. The three-dimensional printing apparatus as claimed in claim 4, wherein the springs at the opposite sides of the base or the tank have different elastic coefficients.

6. The three-dimensional printing apparatus as claimed in claim 4, wherein the base or the tank has a first side and a second side that are opposite, and in each of the floating units at the first side, there is a first relative distance between the first connection part and the third connection part corresponding to each other, while in each of the floating units at the second side, there is a second relative distance between the second connection part and the fourth connection part corresponding to each other, the first relative distance differing from the second relative distance.

7. The three-dimensional printing apparatus as claimed in claim 4, wherein the three-dimensional object is located at a center position of the bottom of the tank.

8. The three-dimensional printing apparatus as claimed in claim 1, wherein the three-dimensional printing apparatus is a stereolithography (SLA) printing apparatus.

* * * * *